(No Model.) 2 Sheets—Sheet 1.
R. F. HORNUNG.
TOUCH REGULATOR FOR KEYED INSTRUMENTS.
No. 580,282. Patented Apr. 6, 1897.
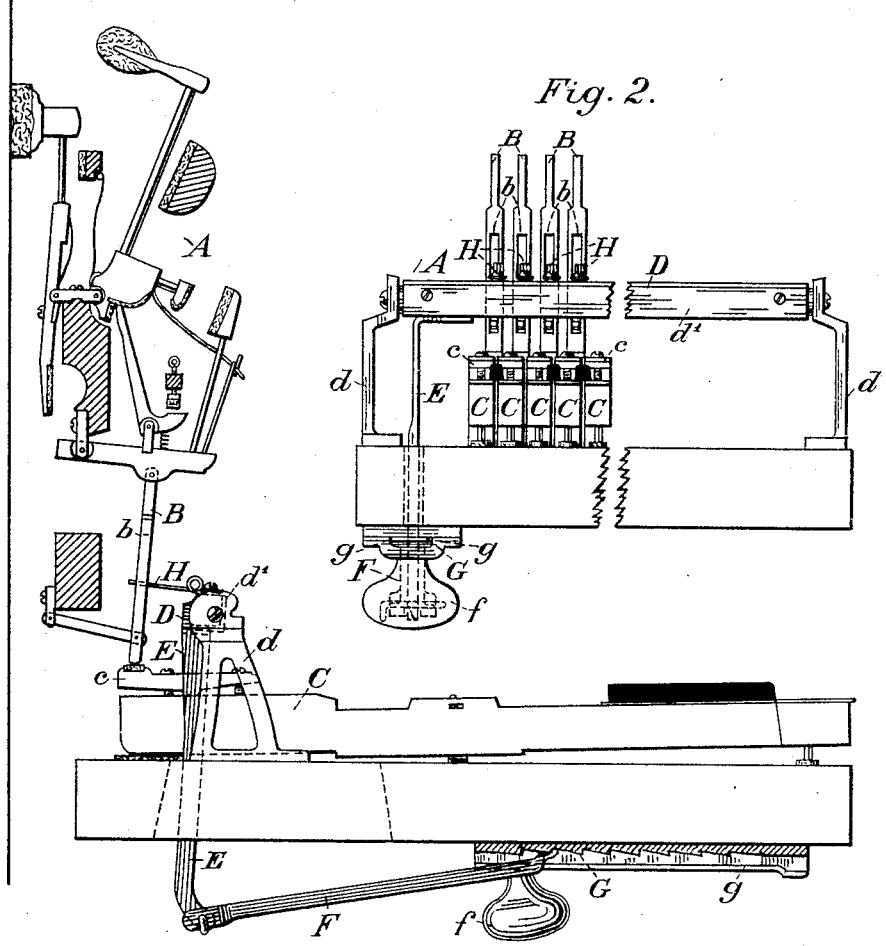

(No Model.) 2 Sheets—Sheet 2.
R. F. HORNUNG.
TOUCH REGULATOR FOR KEYED INSTRUMENTS.

No. 580,282. Patented Apr. 6, 1897.

Witnesses,

Inventor,
Rudolph F. Hornung
By Dewey & Co.
Attys

UNITED STATES PATENT OFFICE.

RUDOLPH F. HORNUNG, OF OAKLAND, CALIFORNIA.

TOUCH-REGULATOR FOR KEYED INSTRUMENTS.

SPECIFICATION forming part of Letters Patent No. 580,282, dated April 6, 1897.

Application filed November 13, 1896. Serial No. 611,933. (No model.)

*To all whom it may concern:*

Be it known that I, RUDOLPH F. HORNUNG, a citizen of the United States, residing at Oakland, county of Alameda, State of California, have invented an Improvement in Touch-Regulators for Keyed Instruments; and I hereby declare the following to be a full, clear, and exact description of the same.

My invention relates to that class of touch-regulating devices for keyed instruments, especially pianos, in which springs are employed to vary the touch of the keys.

My invention consists in the novel means hereinafter described of arranging and mounting the touch-regulating springs and the novel means and mechanism for operating them to throw them into and out of action and to cause them to exert varying degrees of pressure to vary the touch of the keys to suit individual performers.

Simplicity of construction, compactness, and ease of application to the instrument and accuracy and certainty in operation are the objects of my invention.

Figure 4:
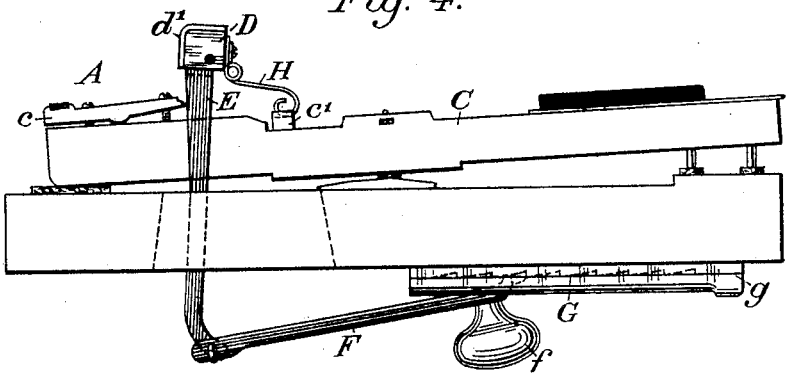
Figure 5:
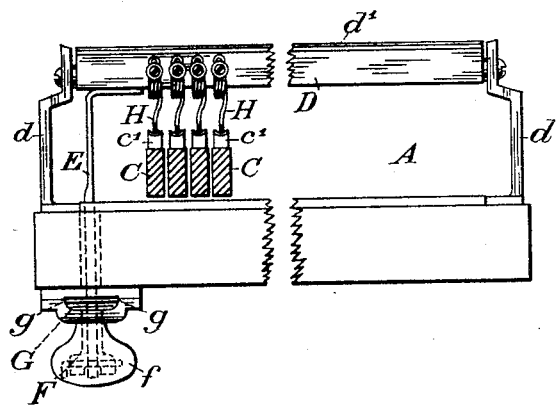

Referring to the accompanying drawings, Figure 1 is an end view of a piano-action, showing the application of the springs to the prolong. Fig. 2 is a front elevation of the same. Fig. 3 is a plan underneath showing rack-bar. Fig. 4 is a view showing the application of the springs to the keys. Fig. 5 is a front elevation of the same.

A represents generally the action of an upright piano, and B is the prolong thereof, the lower end of which rests upon the rocker $c$ on the inner end of the key C.

D is a turnable or rocking shaft or bar which runs through the piano from end to end and is supported in any suitable manner either upon the action-brackets or, as here shown, upon brackets $d$, which are supported upon the key-bed. This shaft or bar is pivoted to these brackets so that it may rock. This movement is imparted to the shaft or bar by means of a crank-arm E, which extends downwardly through a suitable opening in the key-bed and has connected with its lower end a rod F, the extremity of which serves as a pawl and is adapted to engage with a ratchet-bar G, secured under the key-bed. This pawl-rod F is guided in its movement along the ratchet-bar by means of suitable side flanges $g$, having inwardly-turned lower edges, and it is also provided with a handle $f$, by which it may be readily operated.

By moving this handle in one direction the pawl-rod is slipped along the ratchet-teeth and may be held by engaging said teeth in any position desired, and in this movement through the crank-arm E the rocking bar D is made to oscillate.

The touch-regulating springs H are all carried by this rocking shaft or bar D, and said springs, though they may be of any suitable shape, are preferably constructed, as here shown, of spring-wire coiled, and having their projecting ends adapted to bear upon the part upon which their pressure is intended to be exerted. This part may be either any portion of the action or its prolong or the key itself, and to illustrate this sufficiently I have here shown the springs as being adapted to act either upon the prolong or upon the keys.

In the former instance, as shown in Fig. 2, the prolong is provided with a slot $b$, into which the spring projects freely, though this is but one form of the engagement of the spring with the prolong, as it may be effected in other ways, as by bearing upon a block attached to the prolong.

In the other form, as in Fig. 4, the spring is adapted to bear upon the key itself in practice through the intervention of a small cushioned and grooved block $c'$ on said key.

The rocking shaft or bar D is in practice strengthened by means of an angle-iron $d'$, extending its entire length and adapted to properly stiffen it.

The operation of the device is as follows: When the handle $f$ is properly moved by the operator, the shaft or bar D is rocked so that it will raise all its springs H out of contact with the prolong or with the key or other part, as the case may be; but when the handle is moved in the opposite direction the shaft or bar D is rocked so as to bring the ends of its springs down upon the part upon which they are to bear, and, according to the extent of the movement of the handle, the springs are brought to bear with more or less pressure in order to vary and regulate the touch of the key to suit the performer. The springs being all carried by the turnable shaft or bar, the latter may be brought into close proximity with the parts to be directly operated upon, and may be mounted conveniently within the piano and inserted in pianos already made, as desired, requiring little or no previous work in the factory. The movement of the bar or shaft D, being a simple rocking one, is easily effected by means of simple power-transmitting connections, and said bar is not liable to get out of order, but will always act with accuracy and certainty.

In Fig. 1, in which the springs engage the prolong, their pressure is brought to bear upon the prolong by drawing the handle $f$ outward, and, as shown in Fig. 4, the result is effected by pushing it in the opposite direction.

Having thus described my invention, what I claim as new, and desire to secure by Letters Patent, is—

1. An improved touch-regulator for keyed instruments, consisting of the combination of a shaft or bar extending through the instrument from end to end and having end pivots, brackets for receiving said pivots and supporting the bar, a series of springs formed of wire coiled at points between opposite ends, having one of said ends secured to the bar and the other to bear upon a member of the action of the instrument, a crank-arm connected with the rocking bar, a rod connected with the arm and provided with a pawl and a ratchet-bar having guiding-flanges for the pawl and retaining the pawl in place.

2. An improved touch-regulator for keyed instruments, consisting of the combination of a pivotally-mounted bar, a series of coiled springs adapted to be secured thereto and to have their free ends to contact with a member of the action of the instrument and a crank-arm depending from said bar, of a ratchet-bar having side flanges provided with inturned lower edges and a rod connected with the crank-arm, having a pawl at its free end adapted to engage said ratchet-bar and to freely slide between the side flanges thereof, and be held from dropping out of disengagement with the ratch-bar.

In witness whereof I have hereunto set my hand.

RUDOLPH F. HORNUNG.

Witnesses:
S. H. NOURSE,
JESSIE C. BRODIE.